United States Patent [19]

Kennis

[11] 4,208,927
[45] Jun. 24, 1980

[54] STEERING COLUMN COUPLING DEVICE

[76] Inventor: Lucas L. Kennis, Statielei 40, 2510 Mortsel, Belgium

[21] Appl. No.: 907,041

[22] Filed: May 17, 1978

[30] Foreign Application Priority Data

Feb. 3, 1978 [BE] Belgium .................................. 256661

[51] Int. Cl.² .......................................... B62D 1/18
[52] U.S. Cl. .................................................. 74/493
[58] Field of Search ........................ 74/492, 493, 552; 403/350, 351, 356

[56] References Cited

U.S. PATENT DOCUMENTS

| 2,075,110 | 3/1937 | Garretson | 74/493 |
|---|---|---|---|
| 2,214,163 | 9/1940 | Frees | 74/493 |
| 2,584,636 | 2/1952 | Sprinkel et al. | 74/493 X |
| 2,818,930 | 1/1958 | Kucera | 74/493 X |
| 2,883,877 | 4/1959 | McGavock | 74/493 |
| 3,491,614 | 1/1970 | Saunders et al. | 74/493 |
| 3,491,663 | 1/1970 | Morgan | 74/493 |
| 3,922,928 | 12/1975 | Kester | 74/492 |
| 3,962,931 | 6/1976 | Moneta | 74/493 |
| 4,014,219 | 3/1977 | Feustel et al. | 74/492 |
| 4,028,961 | 6/1977 | Utsumi et al. | 74/492 |

FOREIGN PATENT DOCUMENTS

| 698526 | 10/1940 | Fed. Rep. of Germany | 74/493 |
|---|---|---|---|
| 1929784 | 12/1969 | Fed. Rep. of Germany | 74/493 |
| 490959 | 8/1938 | United Kingdom | 74/493 |
| 1079160 | 8/1967 | United Kingdom | 74/493 |

Primary Examiner—Samuel Scott
Assistant Examiner—Randall L. Green
Attorney, Agent, or Firm—Haseltine, Lake & Waters

[57] ABSTRACT

Steering column coupling device, characterized by the fact that it consists mainly in providing a steering column in two parts, whereby one part is provided so as to be able to be removed in a simple manner, or respectively refitted, so that the connection between the steering column and the steering wheel can be severed, or respectively re-established.

2 Claims, 14 Drawing Figures

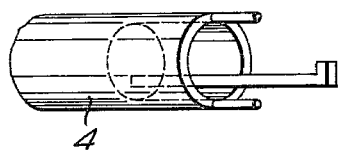
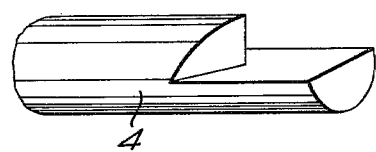
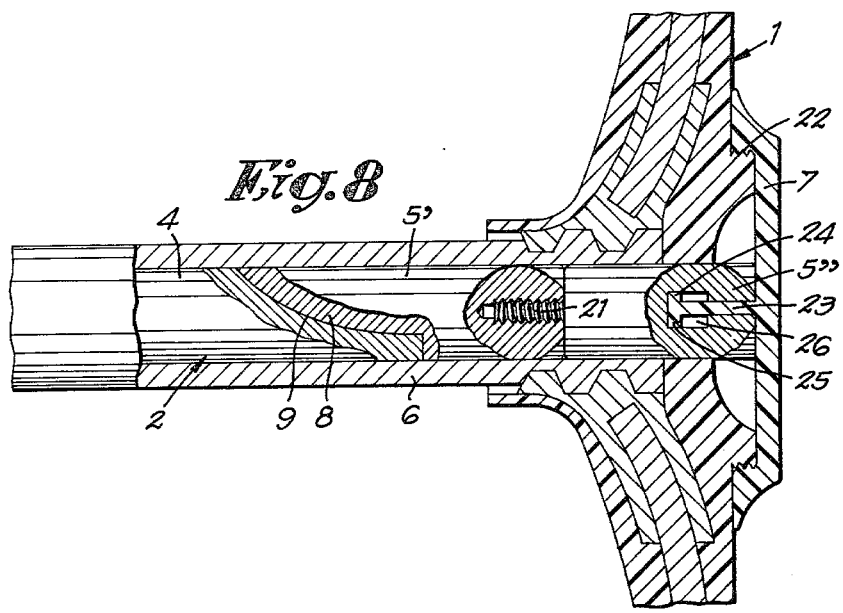
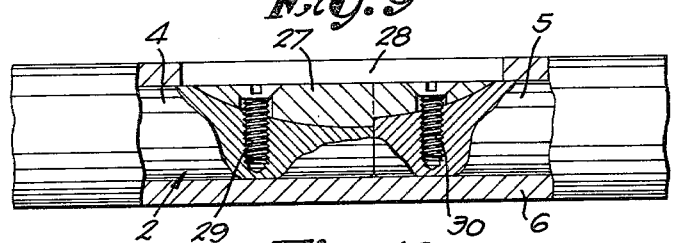
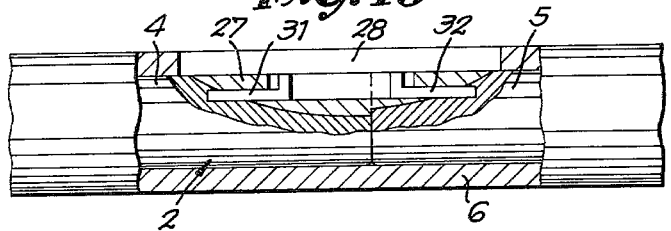

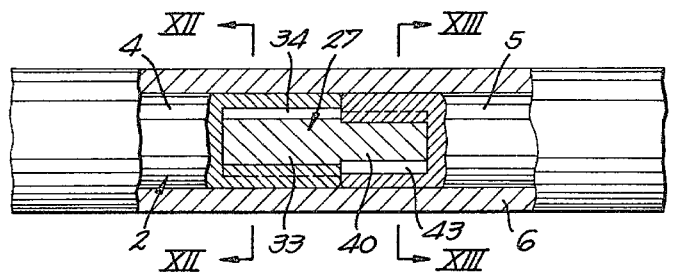
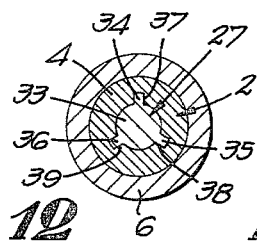
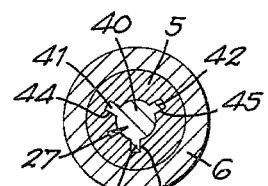
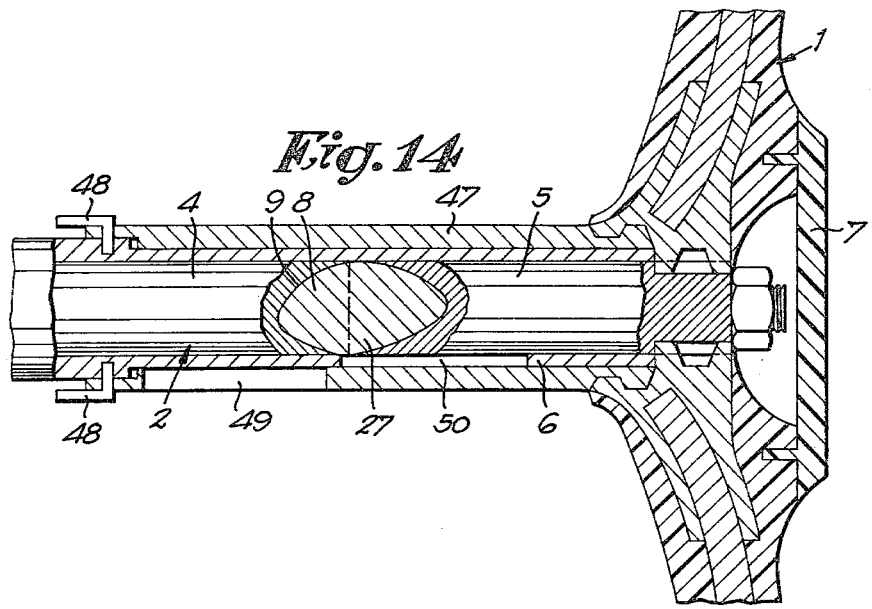

STEERING COLUMN COUPLING DEVICE

The present invention pertains to a device which permits the steering wheel of a motor vehicle to be coupled, or respectively uncoupled, in a most simple manner from the actual steering column, in order thus to prevent the stealing of the vehicle under consideration.

It is perfectly clear that when the connection between the steering wheel and the steering column is severed in some appropriate manner, the driving of the vehicle becomes impossible, whereas when this rupture is carried out in such a way that the renewed connection thereof is extremely difficult for unqualified people, the chances of the vehicle being stolen become very slight, as compared to the curently known safety devices such as steering locks and the like, which can be neutralized with relative ease by professional thieves.

The device according to the invention which permits the steering wheel of a car to be coupled to, and respectively freed from the steering column in some simple manner, for this purpose mainly consists in providing a steering column in two parts, whereby one of these parts is provided so as to be able to be simply removed, or respectively refitted, so as to sever or respectively re-establish the connection between the steering column and the steering wheel.

In order to show the characteristics of this invention more clearly, a few preferred forms of embodiment thereof will be described hereinafter, merely as examples and without intent of limitation, with reference to the appended drawings in which:

FIGS. 4, 5, 6 and 7 show perspective views of a few examples of steering column coupling elements according to the invention;

FIG. 8 is a view which is similar to that of FIG. 2, but for an alternative form of embodiment;

FIGS. 9, 10 and 11 schematically show further steering couplings according to the invention;

FIGS. 12 and 13 respectively show sections according to lines XII—XII and XIII—XIII in FIG. 11;

FIG. 14 illustrates yet a further example of a steering column coupling according to the invention.

Figure 1:
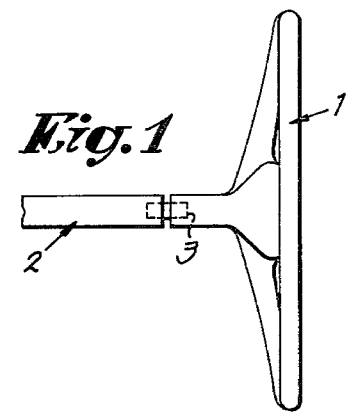
FIG. 1 shows a very schematic side view of a steering column coupling according to the invention.

As illustrated in FIG. 1, the principle according to the invention mainly consists in providing an appropriate coupling element 3 between the steering wheel 1 and the steering column 2, which, when the driver leaves his vehicle, can be removed so as to break the connection between steering wheel and steering column and thus make the driving of the vehicle impossible, whereas subsequently, when the driver again wishes to use his vehicle, afore-mentioned element can again be fitted. Such an element 3 shall be of an appropriate shape which must obviously be different for each vehicle, such as is at present the case for the keys of a car, wherefore it will then be sufficient to provide element 3 with such an irregular shape, which must cooperate on the one hand with the steering wheel 1, and on the other hand with the steering column 2, that the copying thereof, for the purpose of stealing the car, is extremely difficult and most time consuming.

Figure 2:
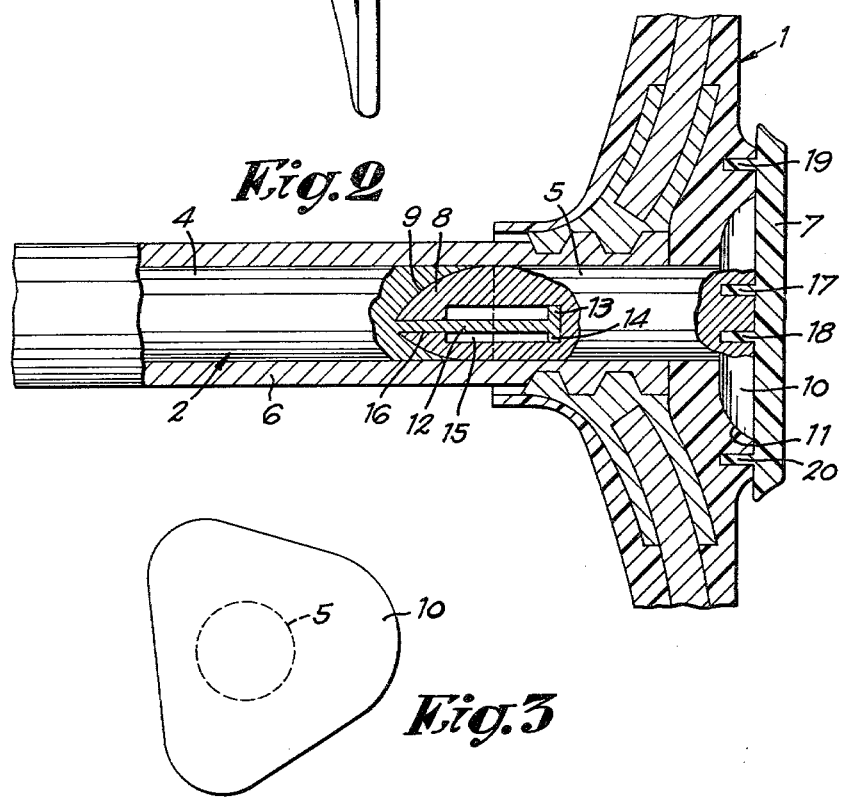
FIG. 2 shows a partial view of a steering column coupling developed according to the invention.

In the form of embodiment according to FIG. 2, the steering column 2, is built in two parts, respectively 4 and 5, whereby a housing 6 is provided around steering column 2, upon which housing the actual steering wheel 1 is fitted, and whereby the central opening of the steering wheel, through which part 5 of the steering column would normally be visible, is hidden by a cover plate 7.

As appears from FIG. 2, part 5 of the steering column is made cylindrical, and fits, same as part 4, in the tube or housing 6, whereby the latter part is in this case provided at the front with a specially shaped end 8 which can cooperate with congruent hollow 9 in part 4 of the steering column, whereas the other end boasts a widened part or head 10 which fits precisely in a hollow 11 of the steering wheel.

As also appears from FIG. 2, part 4 of the steering column is in this case further provided with a protrusion 12 which at its free end may for instance carry one or more transverse protrusions, in the present case two, respectively 13 and 14, whereby a chamber 15 is provided in part 5 of the steering column into which protrusions 13 and 14 can be fitted after part 5 has been rotated by 90°. It is indeed required first to slip hollow 16 over protrusions 13 and 14 in order subsequently to rotate part 5 by 90°. When this part 5 has been rotated by 90° and cooperates completely with part 4 of the steering column, an appropriate connection is obtained between parts 4 and 5, after which it will suffice to form a further connection between part 5 and the steering wheel, in the present case by means of cover plate 7 which is provided for this purpose with protrusions, respectively 17-18-19 and 20, part of which cooperate with afore-mentioned part 5 of the steering column and another part with the steering wheel.

When the device is in the condition as illustrated in FIG. 2, the rotation of steering wheel 1 causes the rotation of part 4 of the steering column, whereas, when the driver of the vehicle leaves the latter and, after removing cover plate 7 and afore-mentioned part 5 and possibly refitting cover plate 7, the rotation of the steering wheel thus merely causes either the free rotation thereof around shaft 6, or in certain cases the rotation of housing 6 with the steering wheel 1, whereby however in such a case the housing rotates freely around steering column 4, so that the vehicle cannot be driven.

Due to the special shape which can be given to such a part 5, the imitation of this shape becomes, if not impossible, nevertheless extremely difficult and time consuming.

Such a device may or not be used in combination with some known steering lock, whereas, in order to assure the connection of elements 4 and 5, on the one hand, and 5 and 1, on the other hand, in the most appropriate manner, extra connections, locks or suchlike may be used.

Figure 3:
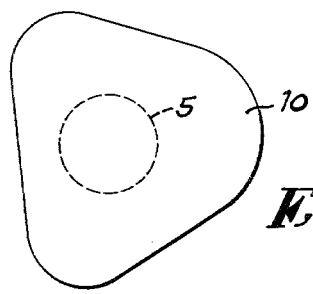
FIG. 3 shows a top view of the steering column coupling part which is used in the form of embodiment according to FIG. 2.
Figure 4:
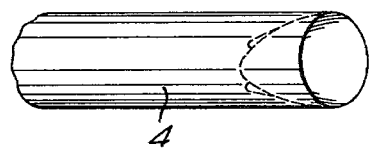
Figure 5:
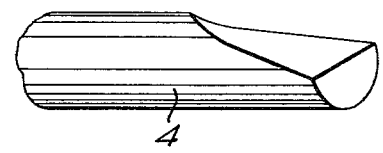

In FIG. 3 a top view is given of element 5, from which it can be seen that this element shall preferably also be given an irregular shape, again in order to make the copying thereof as difficult as possible.

Element 5 shall be made as small as possible so as to facilitate the stowing away thereof, whereby possibly an appropriately small holder can be provided into which it can be fitted when removed from the car.

It is obvious that when such a steering column coupling is being used, various conditions have to be fulfilled, amongst which the shaping of element 5 and respectively of the elements which cooperate therewith, such as elements 4 and 7; the size of this element, in order to make the stowing away thereof as easy as possible, the extension for instance of housing 6, so as to prevent the fitting of clamps which might permit the vehicle to be temporarily driven; the possible application of markings, so as to simplify the refitting of part 5, and then preferably the provision of some warning signal, such as for instance an electric light which will light up when the ignition is switched on, a visible or sound signal or the like in order to warn the driver when he wishes to drive away, that element 5 has not been fitted.

In FIGS. 4 to 7 a few alternative forms of embodiment are illustrated, merely as examples, of the ends of steering column 4 with which an appropriate part 5 must cooperate, whereby it can be seen from these drawings that these parts can be made different for each car by altering the diameter, or respectively diameters; altering the lengths of the cut away portions, hollowed out parts, bores and the like; the provision of different cut away portions; the provision of protrusions, etc..

Similarly, element 5 which must cooperate with element 4 can be provided at its end which must be connected to the steering wheel with differing diameters, shapes, lengths, protrusions, notches, etc..

Considering that an infinite number of alternative shapes can be conceived, so that part 5 can be different for each car, we obtain that the stealing of the car is made extremely difficult, as a cast would have to be made, which is most difficult to start with, of the notches, protrusions, and the like, on the one hand of column 4, and on the other hand of steering wheel 1, after which an appropriate replacement part 5 would have to be fabricated, which is practically impossible.

In FIG. 8 an alternative is shown, whereby part 5 of the steering column consists of two parts, respectively 5' and 5", which are for instance joined together by an appropriate threaded part 21, whereby obviously not shown means shall be provided which prevent the separation of part 5' and 5" while the car is being driven. In this case the construction is practically the same as described with reference to FIG. 2, although in this case the cover plate 7 is connected to the steering wheel by an appropriate threaded part 22, whereby an appropriate connection, which is not further detailed, shall be formed between cover plate 7 and part 5", whereby this connection is realized in the present case by a protrusion 23 of which the free end is provided with protrusions 24 and 25 which are fitted in a chamber 26, of which the width and the thickness are respectively equal to the length and the thickness of protrusions 24 and 25.

It is quite clear that in this case an element 5" to be taken away is obtained which is markedly smaller.

In the form of embodiment according to FIGS. 9 and 10, the steering column coupling device mainly consists of an addition part 27 of appropriate and preferably irregular shape which can cooperate on the one hand with part 4, and on the other hand with part 5 of the steering column, in order to connect these parts together, whereby this addition part 27 is fitted, or respectively removed, through an opening 28 in afore-mentioned housing 6. In the case of FIG. 9 this addition part is secured, for instance by means of screws 29 and 30, whereas in the form of embodiment according to FIG. 10 this securing is provided by sliding bolts, respectively 31 and 32.

In the form of embodiment according to FIG. 11, the addition part 27 consists of a connecting core, of which for instance a part 33 is provided with splines, in the present case three, respectively 34-35-36, which can cooperate with grooves 37-38 and 39 in part 4 of the steering column, whereas part 40 is provided with splines, respectively 41-42 and 43, which can cooperate with grooves, respectively 44-45 and 46, in part 5, whereby splines 34-35-36 are shifted by 45° with respect to splines 41-42-43. It is obvious that in this case part 5 has to be removed first, before addition part 27 can be taken out, after which, for instance, part 5 can be temporarily refitted.

In the form of embodiment as illustrated by FIG. 14, part 5 of the steering column is an integral part of steering wheel 1, whereby the latter is fitted to a tube 47, which itself is fitted to tube 6 in which parts 4 and 5 of the steering column are located. In the position as illustrated in FIG. 14, tubes 47 and 6 shall preferably be attached to each other in some appropriate way, such as for instance by cotter pins or suchlike 48.

In tube 47 as well as in tube 6, openings are provided, respectively 49 and 50 which, after removal of securing cotter pins 48 and the sliding away of the steering wheel with tube 47, can be made to register in order to be able to remove addition part 27 which may obviously, as previously described, boast any appropriate shape and dimensions and has the function of de-coupling together parts 4 and 5 so as to make it impossible to drive the car.

In this manner we obtain a device which permits, on leaving the car, to sever the steering wheel from the steering column, so that the further driving of the vehicle is totally excluded.

What I claim is:

1. Steering column coupling device for intercoupling two constituent members of a steering column, wherein: a coupling member and locking means for interlocking said constituent members in a position wherein a cavity is formed between facing ends of said constituent members, said coupling member being mounted in and fitting in said cavity, mean adjacent said constituent members and having at least one opening through which said cavity is accessible in a non-operative position of said locking means, said cavity being inaccessible in an operative position of said locking means, said opening being positionable to permit removal of said coupling member.

2. Steering column coupling device according to claim 1 wherein a first of said constituent members comprises: a first cylindrical element surrounded by a hollow first tubular element having a portion extending beyond said first cylindrical element and having a first said opening, a second of said constituent members comprising: a second cylindrical element surrounded by a hollow second tubular element having a portion extending beyond said second cylindrical element and having a second said opening, said second tubular member surrounds said first tubular member said hollow second tubular element delimiting with said second cylindrical element a space into which said first tubular element fits, and locking means being adapted to interlock said first and second tubular elements, said cavity being formed between facing ends of said first and second cylindrical elements, said first opening and said second opening being positionable relative to each other to permit removal of said coupling member.

* * * * *